Patented July 8, 1952

2,602,786

UNITED STATES PATENT OFFICE 2,602,786

COPOLYMERS OF MALEIC ANHYDRIDE

Stewart B. Luce, La Grange, Ill., assignor to Swift & Company, Chicago, Ill., a corporation of Illinois No Drawing. Application December 16, 1949, Serial No. 133,493

12 Claims. (Cl. 260—78.3)

This invention relates to improvements in copolymers, and, more particularly, it relates to the copolymerization of maleic anhydride with compounds of the general formula

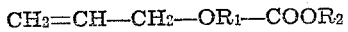

$$CH_2=CH-CH_2-OR_1-COOR_2$$

wherein $R_1$ represents any bivalent straight chain, saturated, aliphatic hydrocarbon radical, but preferably one having a chain length of from 1 to 3 carbon atoms, and $R_2$ is selected from the group consisting of hydrogen and the allyl radical.

It is an object of this invention to provide new copolymers of maleic anhydride.

It is an additional object of this invention to provide copolymers of maleic anhydride and allyl derivatives of hydroxy acids.

It is a further object of this invention to provide a method of copolymerizing maleic anhydride with compounds which are not capable of homopolymerization.

Another object of this invention is to provide a method of forming copolymers of maleic anhydride without the use of a polymerization catalyst.

Additional objects, if not specifically pointed out herein, will be apparent to one skilled in the art from the following detailed description of the invention.

Generally, the present invention comprises copolymerizing maleic anhydride with compounds having the general formula

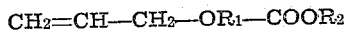

$$CH_2=CH-CH_2-OR_1-COOR_2$$

wherein $R_1$ represents a bivalent straight chain, saturated, aliphatic hydrocarbon radical, preferably one having a hydrocarbon chain of from 1 to 3 carbon atoms, and $R_2$ is selected from the group consisting of hydrogen and the allyl radical. The polymerization reaction is preferably conducted at an elevated temperature. In some instances, the copolymerization may be accelerated by the addition of a polymerization catalyst, such as benzoyl peroxide, although in contradistinction to conventional copolymerization reactions involving maleic anhydride, no catalyst is essential to the reaction.

Several examples of compounds having the aforesaid general formula which may be copolymerized with maleic anhydride according to this invention, are B-allyloxy propionic acid, B-allyloxy allylpropionate, the allyl ethers of glycollic acid, γ-hydroxy butyric acid, and lactic acid (α-hydroxy propionic acid).

In carrying out the preparation of the copolymers, it is desirable to heat the components together at reflux in an oil bath. The temperatures required to effect the reaction will vary with the components used, ranging from room temperature, at which copolymerization would take possibly a month or more for completion, to temperatures above reflux, which would effect rapid copolymerization but would require greater than atmospheric pressures. In general, for all practical purposes, temperatures will range from about 90° C. to 160° C., depending on the particular compounds used. The time required under these conditions will range from about two to twelve hours, depending upon the particular copolymer formed and the degree of copolymerization required. Initial polymerization seems to occur in all cases within a few minutes after heating is begun.

The following specific examples are set forth for the purpose of illustration only, and the scope of the invention is not intended to be limited thereto.

Example I 20 grams of maleic anhydride were mixed with 27 grams of B-allyloxy propionic acid. The mixture was heated at reflux in an oil bath at 150° C. to 160° C. The mixture thickened slowly. At the end of ten hours, the reaction was stopped and a yellow, soft, sticky resin was obtained. This product was substantially soluble in alcohol; it was insoluble in water; it was soluble in alkali; and reprecipitated by acid. An alkali metal salt may be prepared from the polymer for use as a coating medium: for example, the sodium salt of the polymer was prepared with NaOH, and of a piece of paper coated therewith. The dried coating was resistant to oils and greases. Upon treating with an acid, the coating became water resistant. The sodium salt as prepared was found to be water soluble. In a similar manner, the ammonium salt of the polymer was prepared and subsequently used as a coating medium for paper. Upon heating at 150° C. for an overnight interval, the film was found to be water resistant. In general, the use of a relatively high temperature for a short interval of time will be found more suitable in the event that continuous coating is employed. When the B-allyloxy propionic acid was treated alone under the above conditions, no polymerization occurred even with prolonged heating. The allyl ethers of glycollic acid and γ-hydroxy butyric acid copolymerize in a similar manner with maleic anhydride, requiring, however, considerably more time to react and forming a soft, semiliquid product.

Example II 12 grams of maleic anhydride were mixed with 25 grams of B-allyloxy allylpropionate. The mixture was heated at reflux in an oil bath at 150° C. to 160° C. After five minutes, a polymerization had occurred. Heating was continued for two hours. The product was a slightly yellow, hard, brittle resin. It was insoluble in organic solvents, dissolved in hot alkali, but did not precipitate with acid. When the B-allyloxy allylpropionate was treated alone under the above conditions, no polymerization occurred even on heating for several hours at 150° C. to 200° C.

Example III 8 grams of the allyl ether of lactic acid were mixed with 6.8 grams of maleic anhydride. The mixture was heated to melt the anhydride and to give a uniform liquid mixture. Heating was continued at a bath temperature of 90° C. to 120° C. for 12 hours. The product was a hard resin at room temperature. It was thermoplastic and became fluid on heating. It softened in boiling water but did not dissolve. It dissolved in alkali but did not reprecipitate on acidification.

Example IV

To the same mixture as was used in Example III, there was added a couple of grains of benzoyl peroxide catalyst. After ½ hour at 90° C. to 100° C., the mixture had polymerized to a very viscous fluid. Further heating gradually increased the viscosity to give a resin of any desired hardness.

Although in the foregoing examples the ratios of the components are shown as equimolecular, the invention is not restricted to such ratios, as will be apparent from the following table showing the effect of excesses, over equal molecular quantities, of one or the other of the components. This table is based on results obtained by altering the ratio of the components illustrated in Example I above, i. e., maleic anhydride and B-allyloxy propionic acid, and carrying out the polymerization at temperatures within the range of 150° C. to 160° C. for a period of 12 hours.

| Molecular Ratio Maleic Anhydride to Allyloxypropionic Acid | Product |
| --- | --- |
| 1 to 5 | Clear, yellow, very viscous, very soft resinous liquid |
| 1 to 2 | Clear, yellow, tacky resin, very little flow. |
| 1 to 1 | Clear, amber, tacky resin, very little flow. |
| 1½ to 1 | Clear, dark amber, very viscous, very soft resinous liquid. |
| 2½ to 1 | Dark amber fluid filled with crystals. |
| 5 to 1 | Almost solid crystals. |

The exact nature of the copolymerization reaction is unknown. As indicated in the above examples, the allyl derivatives of the general formula set forth herein are generally incapable of homo-polymerization even when heated over an extended period of time. Furthermore, maleic anhydride does not form a homo-polymer upon heating, even with a polymerization catalyst, such as benzoyl peroxide, present.

The resulting copolymers of this invention find application as adhesives, coatings, oil additives, molding compositions, and the like. In most instances, as indicated in Example I, an alkali metal or ammonium salt of the copolymer may be prepared. The alkali metal salts, being water soluble, may be used in adhesives or as coating compounds to impart grease or oil resistance to paper and the like, while the water-resistant ammonium salts are useful in imparting water resistance to paper and the like.

I claim:

1. The process of producing a copolymer comprising mixing maleic anhydride with a compound of the formula $$CH_2=CH-CH_2-OR_1-COOR_2$$

wherein $R_1$ represents a bivalent straight chain, saturated, aliphatic hydrocarbon radical and $R_2$ is selected from the group consisting of hydrogen and the allyl radical, said compound being present in at least an equi-molecular ratio with said maleic anhydride, and heating the mixture so formed at an elevated temperature to form a resinous copolymer.

2. A process as in claim 1 wherein the temperature ranges from about 90° C. to about 160° C.

3. A process as in claim 1 wherein the heating is carried on for a period ranging from 2 to 12 hours.

4. The process of producing a copolymer comprising mixing maleic anhydride with B-allyloxy allylpropionate, said B-allyloxy allylpropionate being present in at least an equi-molecular ratio with said maleic anhydride, and heating the mixture so formed at a temperature between 150° C. and 160° C. for a period of approximately 2 hours.

5. The process of producing a copolymer comprising mixing maleic anhydride with B-allyloxy propionic acid, said B-allyloxy propionic acid being present in at least an equi-molecular ratio with said maleic anhydride, and heating the mixture so formed at a temperature between 150° C. and 160° C. for a period of approximately 10 hours.

6. The process of producing a copolymer comprising mixing maleic anhydride with the allyl ether of lactic acid, said allyl ether of lactic acid being present in at least an equi-molecular ratio with said maleic anhydride, and heating the mixture so formed at a temperature between 90° C. and 100° C. for a period of approximately 12 hours.

7. A copolymer of maleic anhydride and a compound of the formula $$CH_2=CH-CH_2-OR_1-COOR_2$$

wherein $R_1$ represents a bivalent straight chain, saturated, aliphatic hydrocarbon radical and $R_2$ is selected from the group consisting of hydrogen and the allyl radical.

8. The copolymer of maleic anhydride and allyloxy allylpropionate.

9. The copolymer of maleic anhydride and allyloxy propionic acid.

10. The copolymer of maleic anhydride and the allyl ether of lactic acid.

11. The alkali metal salt of a copolymer of maleic anhydride and a compound of the formula $$CH_2=CH-CH_2-OR_1-COOR_2$$

wherein $R_1$ represents a bivalent straight chain, saturated, aliphatic hydrocarbon radical and $R_2$ is selected from the group consisting of hydrogen and the allyl radical.

12. The ammonium salt of a copolymer of maleic anhydride and a compound of the formula $$CH_2=CH-CH_2-OR_1-COOR_2$$

wherein $R_1$ represents a bivalent straight chain, saturated, aliphatic hydrocarbon radical and $R_2$ is selected from the group consisting of hydrogen and the allyl radical.

STEWART B. LUCE.

REFERENCES CITED

The following references are of record in the file of this patent:

UNITED STATES PATENTS

| Number | Name | Date |
|---|---|---|
| 2,340,110 | D'Alelio | Jan. 25, 1944 |
| 2,437,508 | D'Alelio | Mar. 9, 1948 |
| 2,448,246 | Barker | Aug. 31, 1948 |
| 2,479,522 | Strain | Aug. 16, 1949 |
| 2,497,927 | Bruson | Feb. 21, 1950 |
| 2,533,376 | Jones | Dec. 12, 1950 |